United States Patent [19]
Kaiser et al.

[11] Patent Number: 5,687,691
[45] Date of Patent: Nov. 18, 1997

[54] THROTTLE DEVICE AND METHOD FOR PRODUCING A THROTTLE DEVICE

[75] Inventors: Klaus Kaiser; Werner-Karl Marquardt, both of Markgroeningen, Germany

[73] Assignee: Robert Bosch GmbH, Stuttgart, Germany

[21] Appl. No.: 620,238

[22] Filed: Mar. 22, 1996

[30] Foreign Application Priority Data

Mar. 23, 1995 [DE] Germany ............... 195 10 622.9

[51] Int. Cl.$^6$ ............................. F02D 9/10; F16K 1/22
[52] U.S. Cl. ................................. 123/337; 251/305
[58] Field of Search ........................ 123/337, 399; 251/214, 305; 29/890.12

[56] References Cited

U.S. PATENT DOCUMENTS

| | | | |
|---|---|---|---|
| 4,981,284 | 1/1991 | Imamura et al. | 251/305 |
| 5,005,545 | 4/1991 | Wendel et al. | 123/337 |
| 5,092,296 | 3/1992 | Günter et al. | 123/337 |
| 5,188,078 | 2/1993 | Tamaki | 123/337 X |

FOREIGN PATENT DOCUMENTS

| | | |
|---|---|---|
| 466227 | 1/1992 | European Pat. Off. . |
| 3346167 | 7/1985 | Germany . |
| 3924611 | 1/1991 | Germany . |
| 4022825 | 2/1991 | Germany . |
| 4022826 | 2/1991 | Germany . |
| 4305123 | 9/1994 | Germany . |
| 1-24129 | 1/1989 | Japan ............... 123/337 |
| 2067719 | 7/1987 | United Kingdom . |
| 2277368 | 10/1994 | United Kingdom ......... 123/337 |

*Primary Examiner*—Tony M. Argenbright
*Attorney, Agent, or Firm*—Edwin E. Greigg; Ronald E. Greigg

[57] ABSTRACT

A bearing is fixed in a housing in such a way that it is fixed axially relative to a throttle flap shaft which remains rotatable relative to the bearing. The throttle flap shaft can then be gripped relative to the bearing, in a bearing recess of the throttle flap housing. The throttle device is suitable particularly for vehicles having a throttle-type internal combustion engine.

12 Claims, 4 Drawing Sheets

THROTTLE DEVICE AND METHOD FOR PRODUCING A THROTTLE DEVICE

PRIOR ART

The present invention relates to a throttle device for an internal combustion engine and a method for producing a throttle device for an internal combustion engine.

Throttle devices for internal combustion engines conventionally possess a throttle flap shaft which is pivotably mounted in a throttle flap housing and to which a throttle flap is fastened. A gas duct runs through the throttle flap housing. For example, air or a fuel/air mixture can flow through the gas duct to an internal combustion engine. The throttle flap opens or closes the gas duct as a result of the pivoting of the throttle flap shaft.

So that the throttle flap does not butt against the wall of the gas duct, it is known to limit the movability of the throttle flap shaft in its axial direction. In the throttle device shown in German Offenlegungsschrift DE 3,924,611A1, the throttle flap shaft is fixed in the axial direction, that is to say in the longitudinal direction of the throttle flap shaft, by means of a pin extending transversely through the throttle flap shaft. In this throttle device, the fixing of the throttle flap shaft in the axial direction is very complicated to carry out. If the space for the pin in the axial direction is too large, the throttle flap shaft is not fixed sufficiently, and, if the space for the pin is too small, the pivotability of the throttle flap shaft is no longer guaranteed. Complicated adjustment work is necessary in this axial fixing of the throttle flap shaft.

There is also a throttle device, in which there is a step on the throttle flap shaft, said step being actuated in the axial direction against a step on the throttle flap housing by means of an electromagnet. This type of axial fixing of the throttle flap shaft is very complicated, and electrical energy is required in order to generate the force.

A return spring conventionally engages on the throttle flap shaft and pivots the throttle flap shaft into a closing position, in which the gas duct is closed by the throttle flap. The return spring can be designed in such a way that, in addition to the torque, the return spring also acts on the throttle flap shaft in the axial direction and thereby actuates a stop provided on the throttle flap shaft against a stop present on the throttle flap housing. Since the return spring required for this purpose also has to generate an axial force in addition to the torque, this return spring has a bulky construction.

ADVANTAGES OF THE INVENTION

The throttle device according to the invention for an internal combustion engine, and the method according to the invention for producing a throttle device, has an advantage that the axial fixing of the throttle flap shaft can be carried out easily and necessitates little constructional volume. Since the throttle flap shaft is fixed outstandingly in its axial direction, a minimal play can be selected between the throttle flap and the wall of the gas duct. Since the return spring conventionally present does not also have to exert an axial force, a small design can be selected for the return spring.

Advantageous developments and improvements of the throttle device and of the method are possible as a result of the measures listed herein after.

Owing to a clamping means which clamps the bearing means against one of the stops, there is no need for any particularly narrow tolerances in the throttle device, and nevertheless an exact axial fixing of the throttle flap shaft can be carried out.

The throttle device can be designed in such a way that radial forces too can be transmitted via the bearing means, so that no additional radial bearing is required, thus resulting in considerable savings in constructional space.

BRIEF DESCRIPTION OF THE DRAWINGS

Selected, particularly advantageous exemplary embodiments of the invention are represented in simplified form in the drawing and are explained in more detail in the following description.

DESCRIPTION OF THE EXEMPLARY EMBODIMENTS

The throttle device according to the invention can be used in various internal combustion engines, in which a passage through a gas duct is to be controlled by means of a throttle flap. The gas duct is provided, for example, for a flow of air, of a fuel/air mixture, etc. The flow of gas is throttled to a greater or lesser extent, depending on the pivoting position of the throttle flap. The throttle flap can normally be pivoted up to 90°. However, there are also versions, in which the throttle flap can be pivoted through less than 90° or through more than 90°, for example up to 180°. The throttle flap shaft together with the throttle flap fastened to it can be pivoted by means of an actuating device engaging on the throttle flap shaft. The actuating device is, for example, a Bowden cable which engages on the throttle flap shaft and which is operated by a driver via an accelerator pedal. It is also possible, however, for the actuating device to be a servo-motor which adjusts the throttle flap shaft, for example directly or via a gearwheel mechanism or via a Bowden cable. There are also versions, in which, depending on the operating condition, the throttle flap can be adjusted both electrically and mechanically via a Bowden cable. An electromotive adjustment of the throttle flap has been selected by way of example for the exemplary embodiments described below, in order to avoid the description being unnecessarily extensive.

Figure 1:
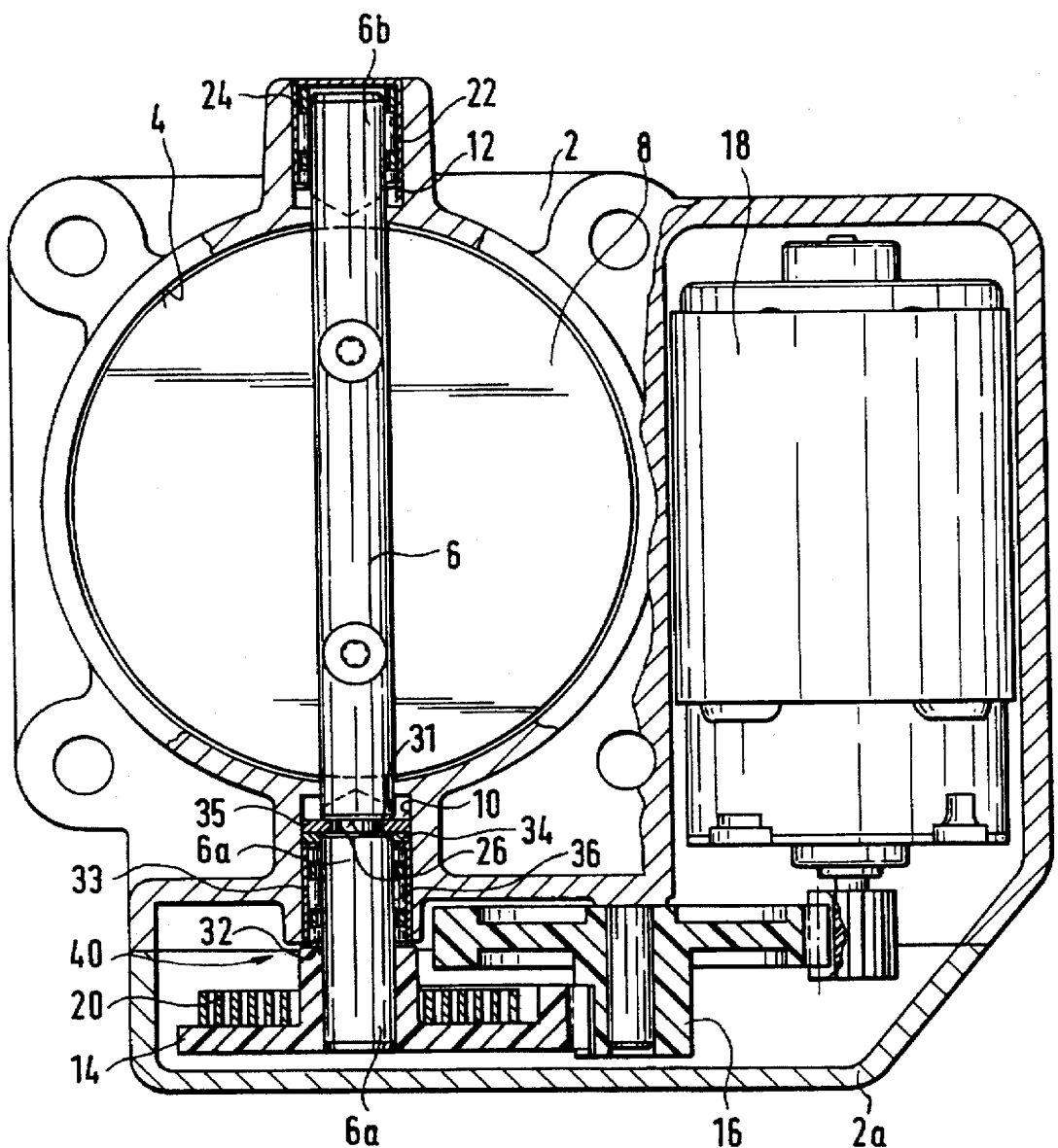
FIGS. 1 and 3 to 6 show differently designed, particularly advantageous, selected exemplary embodiments of the throttle device.

FIG. 1 represents a selected, particularly advantageous exemplary embodiment of the throttle device.

FIG. 1 shows a throttle device with a throttle flap housing 2. A gas duct 4 shown in an end view runs through the throttle flap housing 2. The gas duct 4 is, for example, a suction pipe leading to combustion spaces in an internal combustion engine. A throttle flap shaft 6 pivotably mounted in the throttle flap housing 2 extends transversely through the gas duct 4. A throttle flap 8 is fastened to the throttle flap shaft 6.

A bearing recess 10 and a further bearing recess 12 are provided respectively on the throttle flap housing 2 and in the throttle flap housing 2. The throttle flap shaft 6 is pivotably mounted in the bearing recesses 10, 12.

A means of articulation 14 is fixedly connected to the throttle flap shaft 6. In the exemplary embodiment illustrated, the means of articulation 14 takes the form of a gearwheel injection-molded onto the throttle flap shaft 6. Since the throttle flap 8 is to be pivoted by no more than 90°, it is sufficient if the gearwheel injection-molded on has, only in a range of 90°, outer teeth which mesh with a further mechanism wheel 16. The mechanism wheel 16 is rotatably mounted on the throttle flap housing 2 and is driven by an actuating device 18. The actuating device 18 engages on the throttle flap shaft 6 via the mechanism wheel 16 and via the means of articulation 14. The throttle flap 8 can be adjusted in the desired way by the appropriate activation of the actuating device 18.

A return spring 20 is provided in the throttle device. One end of the return spring 20 engages on the throttle flap housing 2, and the other end of the return spring 20 engages on the means of articulation 14. The return spring 20 acts on the throttle flap shaft 6 with the aim of operating the throttle flap 8 into its closing position.

The throttle flap shaft 6 has an end 6a and an end 6b. The end 6b of the throttle flap shaft 6 is pivotably mounted in the region of the bearing recess 12 by means of a radial bearing 22. A cover 24 ensures that no gas exchange between the gas duct 4 and the environment can take place at this location. The radial bearing 22 is designed in such a way that it can transmit essentially only radial forces, that is to say no or virtually no axial forces, between the throttle flap shaft 6 and the throttle flap housing 2.

A groove 26 is provided on the throttle flap shaft 6 in the region of its end 6a. As a result of the groove 26, a first stop 31 is formed on the throttle flap shaft 6. The end face of the means of articulation 14 confronting the first stop 31 serves as a second stop 32. Since the means of articulation 14 is fixedly connected to the throttle flap shaft 6, the second stop 32 on the end face of the articulation lever 14 has the same effect as though it were provided directly on the throttle flap shaft 6. The second stop 32, like the first stop 31, can therefore be designated as belonging to the throttle flap shaft 6.

Located between the two stops 31, 32 are a bearing means 33, a clamping means 34, a holding element 35 and, if appropriate, as required, a plurality of rolling bodies 36. The rolling bodies 36 are, for example, balls, cylindrical needles or cylindrical rollers of a rolling bearing. In the exemplary embodiment illustrated in FIG. 1, the bearing means 33 also serves as an outer rolling-bearing cage ring for the rolling bodies 36.

The clamping means 34 ensures pretensioning in the axial direction. The clamping means 34 acts, on the one hand, on the first stop 31 via the holding element 35 and, on the other hand, on the bearing means 33. The clamping means 34 acts on the throttle flap shaft 6 via the stop 31 in such a way that the second stop 32 is operated with pretension against the bearing means 33. The clamping force of the clamping means 34 is, on the one hand, of at least such a magnitude that, under normal operating conditions, the bearing means 33 bears on the second stop 32, without lifting off, but, on the other hand, at most such that friction remains as low as possible during a rotation of the throttle flap shaft 6.

Instead of being arranged between the holding element 35 and the bearing means 33, the clamping means 34 can also be arranged between the bearing means 33 and the second stop 32. The average person skilled in the art can implement this modification of the embodiment illustrated, even without an additional pictorial representation.

The clamping force of the clamping means 34 is of a magnitude such that the bearing means 33 can be rotated relative to the throttle flap shaft 6 or the throttle flap shaft 6 relative to the bearing means 33 by means of a relatively low torque. The torque necessary for this purpose is so low that it does have a noticeable adverse effect on the torque required as a whole for the pivoting movement of the throttle flap 8. During the rotation of the throttle flap shaft 6, the bearing means 33 rubs against the second stop 32 on the end face, and the bearing means 33 rubs with its other end face against the clamping means 34, or else the relative movement takes place between the clamping means 34 and the holding element 35, or there is relative movement between the holding element 35 and the first stop 31. Where the relative movement is expediently to take place can be determined in a simple way by an average person skilled in the art by means of an appropriate shaping or by an appropriate material selection, that is to say by appropriate friction parameters.

In the exemplary embodiment illustrated, the bearing recess 10 on the throttle flap housing 2 is designed as a stepped bore. The larger inside diameter of the stepped bearing recess 10 has a diameter, the size of which is such that, when the bearing means 33 is introduced into the bearing recess 10, the bearing means 33 is gripped fast in the bearing recess 10. The pressure between the bearing means 33 and the bearing recess 10 is of a magnitude such that, under operating conditions, no axial slipping of the bearing means 33 within the bearing recess 10 can occur. On the other hand, however, the pressure is also selected so that, during assembly, the bearing means 33 can be introduced or pressed into the bearing recess 10 with relatively little effort.

The rolling bodies 36 are not necessary for the axial fixing of the throttle flap shaft 6. The rolling bodies 36 ensure, however, that radial forces too can be transmitted via the bearing means 33, so that there is no need for any additional radial bearing, thus saving a considerable additional outlay in terms of constructional space. Since the bearing means 33 is retained in the throttle flap housing 2 and is fixed in the axial direction relative to the throttle flap shaft 6 by bearing on the second stop 32, no axial forces have to be transmitted via the rolling bodies 36, thus appreciably simplifying the design of the device as a whole.

Figure 2:
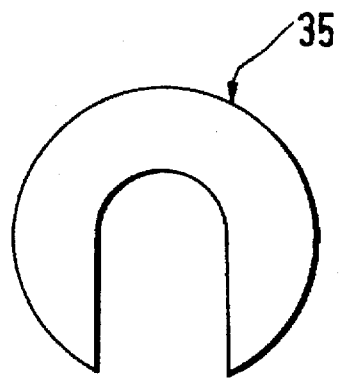
FIG. 2 shows an example of the design of the detail of the throttle device.

FIG. 2 shows a lateral top view of the holding element 35 by way of example on a different scale. The holding element 35 is represented as a separate component, before it is installed in the throttle device or after it has been extracted from the throttle device.

In all the figures, identical or identically acting parts are provided with the same reference symbols. A superscript is added to the reference symbol in the case of similar or similarly acting parts.

As shown in FIG. 2, the holding element 35 is of very simple design. The holding element 35 is a simple slotted disc. The holding element 35 can be inserted into the groove 26 in a simple way before the throttle flap shaft 6 is introduced into the throttle flap housing 2. As soon as the throttle flap shaft 6 is mounted in the throttle flap housing 2, the holding element 35 can no longer fall out of the groove 26. The holding element 35 is prevented from falling out by the bearing recess 10.

The procedure described below is proposed for the purpose of a simple assembly of the throttle device.

First of all, the means of articulation 14 is connected to the throttle flap shaft 6. This can take place, for example, by the injection-molding of the means of articulation 14 consisting of plastic onto the end 6a of the throttle flap shaft 6. Subsequently, the rolling bodies 36, the bearing means 33 and the clamping means 34 can be pushed without effort onto the throttle flap shaft 6 from the end 6b. Thereafter, the clamping means 34 and the bearing means 33 are pressed against the second stop 32, until the holding element 35, which is shaped, for example, as shown in FIG. 2, can be introduced laterally into the groove 26. On account of the clamping force of the clamping means 34, the holding element 35 is pressed against the first stop 31 in such a way that the holding element 35 cannot fall out while the throttle device is being assembled. The throttle flap shaft 6, articulation lever 14, bearing means 33, clamping means 34, holding element 35 and rolling bearings 36 constitute a preliminary subassembly 40. The preliminary subassembly 40 can be assembled easily, before this preliminary subassembly 40 is brought into contact with the throttle flap housing 2.

Before the preliminary subassembly 40 is assembled together with the throttle flap housing 2, the return spring 20 is fitted. The return spring 20 can, if appropriate, also be considered as an integral part of the preliminary subassembly 40.

Subsequently, the throttle flap shaft 6 is introduced into the bearing recess 10, with the end 6b in front. The preliminary subassembly 40 can be installed without effort before the bearing means 33 has reached the bearing recess 10. As soon as the bearing means 33 reaches the bearing recess 10, it must be pressed with moderate effort, until the throttle flap shaft 6 is exactly at the desired location. Thereafter, without further securing measures, the throttle flap shaft 6 is positioned exactly in the throttle flap housing 2 and is fixed permanently in the axial direction. As just described, the bearing means 33 can be pressed into the throttle flap housing 2. It is also possible to fix the bearing means 33 in the throttle flap housing 2 in another way, for example by adhesive bonding.

After the installation or mounting of the preliminary subassembly 40, mechanism wheel 16 and actuating device 18, a cover 2a protecting the components mentioned is connected to the throttle flap housing 2.

Figure 3:
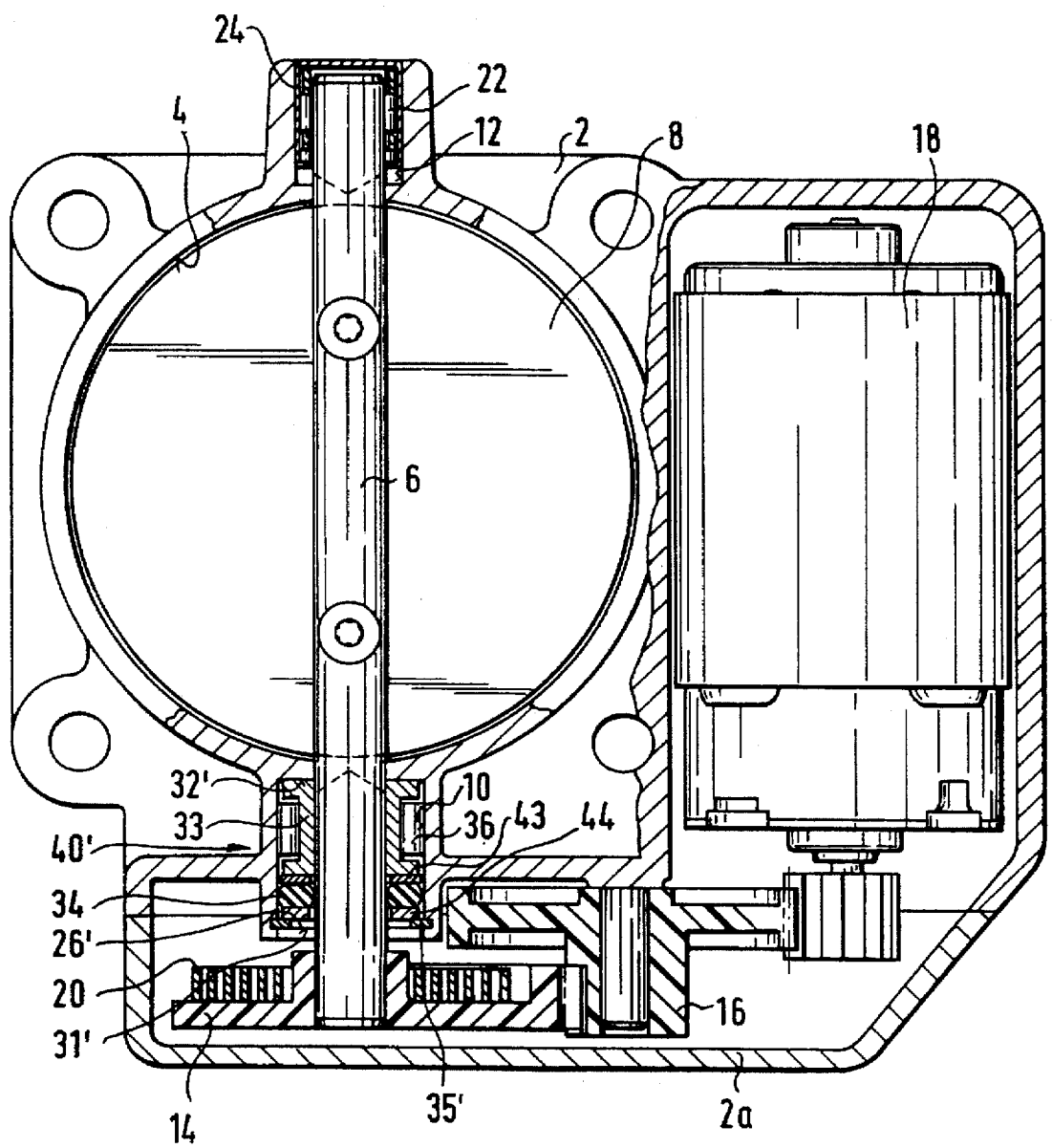

FIG. 3 shows a further possibility, selected by way of example, for the design of the throttle device according to the invention.

Provided that nothing to the contrary is mentioned or shown in the drawing, what was mentioned and shown with reference to one of the figures also applies to the other exemplary embodiments. Provided that nothing to the contrary emerges from the explanations, the details of the various exemplary embodiments can be combined with one another.

In the exemplary embodiment illustrated in FIG. 3, there is a groove 26' on the bore wall of the bearing recess 10. The end side face of the groove 26' facing the gas duct 4 forms a first stop 31'. A second stop 32' is formed at the transition from the larger diameter to the smaller diameter of the bearing recess 10. A holding element 35' is installed in the groove 26'. There can be used as a holding element 35' a commercially available spring ring or retaining ring which can be installed in the groove 26' by means of a simple commercially available tool. Located between the two stops 31', 32' are the bearing means 33, the clamping means 34, the holding element 35', a sliding washer 43 and a thrust washer 44. The throttle flap housing 2, bearing means 33, clamping means 34, holding element 35', rolling bodies 36, sliding washer 43 and thrust washer 44 constitute a preliminary subassembly 40' which can be assembled before the throttle flap shaft 6 together with the means of articulation 14 is installed in the throttle flap housing 2. If the device is to be particularly simple, the sliding washer 43 and thrust washer 44 can be dispensed with.

The bearing means 33 is dimensioned in such a way that, in the event of a rotation of the bearing means 33, it can be rotated very easily relative to the throttle flap housing 2. During this rotation of the bearing means 33, there occur a relative movement between one end face of the bearing means 33 and the stop 32' and also a relative movement between the other end face of the bearing means 33 and the sliding washer 43 or between the sliding washer 43 and the clamping means 34 or between the clamping means 34 and the thrust washer 44 or between the thrust washer 44 and the holding element 35' or between the holding element 35' and the stop 31'. It is proposed, however, to select the material for the sliding washer 43 in such a way that the relative movement occurs between the sliding washer 43 and that end face of the bearing means 33 facing the sliding washer 43.

In the exemplary embodiment shown in FIG. 3, the inside diameter of the bearing means 33 is coordinated with the diameter of the throttle flap shaft 6 in such a way that effort is needed to insert the throttle flap shaft into the bearing means 33. The pressure between the two parts 6, 33 is of a magnitude such that, under operating conditions, no mutual axial slipping of the two parts 6, 33 can take place. The bearing means 33 retains the throttle flap shaft 6 in the axial direction, without the throttle flap shaft 6 having to be provided for this purpose with, for example, a step, a groove or the like.

In the exemplary embodiment shown in FIG. 3 too, the rolling bodies 36 ensure a smooth-running radial mounting of the throttle flap shaft 6. Also, the throttle flap shaft 6 is fixed exactly in the axial direction, in that the bearing means 33 bears reliably on the stop 32'.

In the exemplary embodiment shown in FIG. 3 too, there is a simple possibility for assembling the throttle device by means of a procedure, such as described below.

In the first place, the bearing means 33 together with the rolling bodies 36, the sliding washer 43, the clamping means 34 and the thrust washer 44 are installed in the bearing recess 10. With slight pressure in the axial direction on the thrust washer 44, the holding element 35' can easily be installed in the groove 26'.

After completion of the preliminary subassembly 40', the throttle flap shaft 6 together with the mounted means of articulation 14 and with the attached return spring 20 is installed. The inside diameter of the bearing means 33 has a dimension such that there is sufficient pressure between the bearing means 33 and the throttle flap shaft 6, so that the throttle flap shaft 6 cannot be displaced relative to the bearing means 33 during the life of the throttle device, but, on the other hand, the dimensioning of the inside diameter of the bearing means 33 nevertheless also allows for the fact that, during assembly, the throttle flap shaft 6 can be pushed into the bearing means 33 with justifiable effort. Instead of by pressure, the bearing means 33 can also be fixedly connected to the throttle flap shaft 6, for example, by means of adhesive bonding.

The throttle flap shaft 6 is pushed into or through the bearing means 33 until the throttle flap shaft 6 has reached its desired position, in which it is permanently fixed exactly by the bearing means 33.

The throttle flap 8 is subsequently connected to the throttle flap shaft 6, and this connection can be made, for example, by means of two screws.

Figure 4:
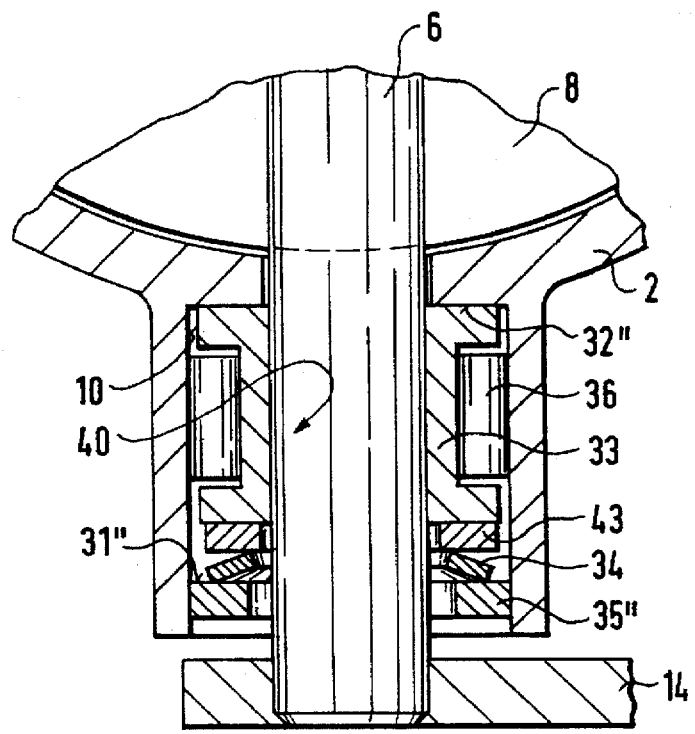

The clamping means 34 is, for example, as seen in the axial direction, that is to say in the longitudinal direction of the throttle flap shaft 6, a resilient corrugated washer which, in the installed state, ensures a spring force in the axial direction (FIG. 1). The clamping means 34 can also be a cup spring which fulfills the same purpose (FIG. 4). However, the clamping means 34 can also consist of another elastic material, such as, for example, of rubber, elastic plastic or another polymeric or elastomeric material (FIG. 3). This material can be shaped in such a way that it simultaneously also ensures sealing off between the throttle flap shaft 6 and the throttle flap housing 2. The clamping means 34 can be shaped, for example, in the form of an O-ring (FIG. 3) or in the form of a grooved ring, X-ring, etc. The clamping means 34 can have virtually any form conventional for sealing rings.

FIG. 4 shows a detailed version of a modified throttle device according to the invention by way of example on a different scale.

In the exemplary embodiment illustrated in FIG. 4, the groove 26' shown in FIG. 3 is dispensed with. Instead, a modified holding element 35" is pressed into the bearing recess 10 in such a way that the holding element 35" is fixed fast in the bearing recess 10. The holding element 35" is, for example, gripped fast or adhesively bonded in the bearing recess 10. In the exemplary embodiment shown in FIG. 4, the clamping means 34 can be supported on a stop 31" formed on the holding element 35".

The clamping means 34 clamps the bearing means 33, gripped fast together with the throttle flap shaft 6, against the second stop 32" provided on the throttle flap housing 2, so that the throttle flap shaft 6 is fixed in its axial direction.

During a pivoting movement of the throttle flap shaft 6, a relative movement occurs between the stop 32" and the end face of the bearing means 33 confronting the stop 32". In addition, a relative movement occurs between the sliding washer 43 and the end face of the bearing means 33 confronting the sliding washer 43, or a relative movement occurs between the sliding washer 43 and the clamping means 34 or between the clamping means 34 and the holding element 35". In principle, the sliding washer 43 can also be dispensed with. The clamping means 34 can also be provided between the second stop 32" and the bearing means 33.

Figure 5:
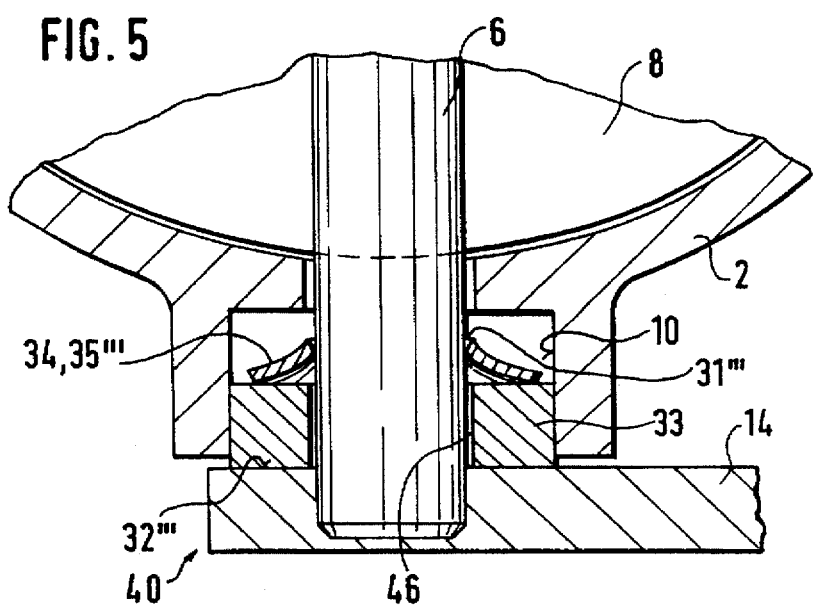

FIG. 5 shows a further possibility, selected by way of example, for the design of the throttle device according to the invention.

In the exemplary embodiment illustrated in FIG. 5, the clamping means 34 is integrated into the holding element 35'''. The holding element 35''' is so designed and so dimensioned on its inside diameter that it can be displaced on the throttle flap shaft 6 solely in the direction toward the second stop 32'''. After the holding element 35''' has been mounted on the throttle flap shaft 6, the holding element 35''' meshes with the throttle flap shaft 6 and also acts as a clamping means 34. In the mounted state, the clamping means 34 or the holding element 35''' meshes on a stop 31''' forming at the point of contact with the throttle flap shaft 6. As a result of the clamping means 34, in the exemplary embodiment illustrated in FIG. 5 too, the bearing means 33 is held in the axial direction between the first stop 31''' and the second stop 32'''.

In the exemplary embodiment according to FIG. 5, the preliminary subassembly 40 comprises the throttle flap shaft 6, the bearing means 33, the clamping means 34 and the holding element 35'''. After the preliminary subassembly 40 has been installed in the throttle flap housing 2, the throttle flap shaft 6 is fixed in the axial direction relative to the throttle flap housing 2 via the bearing means 33.

A narrow bearing play 46 occurs in the radial direction between the throttle flap shaft 6 and the bearing means 33. The bearing play 46 has a dimension such that a sliding bearing is obtained at this location for the radial guidance of the pivotable throttle flap shaft 6. Consequently, in the exemplary embodiment illustrated in FIG. 5, a rolling mounting of the throttle flap shaft 6 can be dispensed with.

Figure 6:
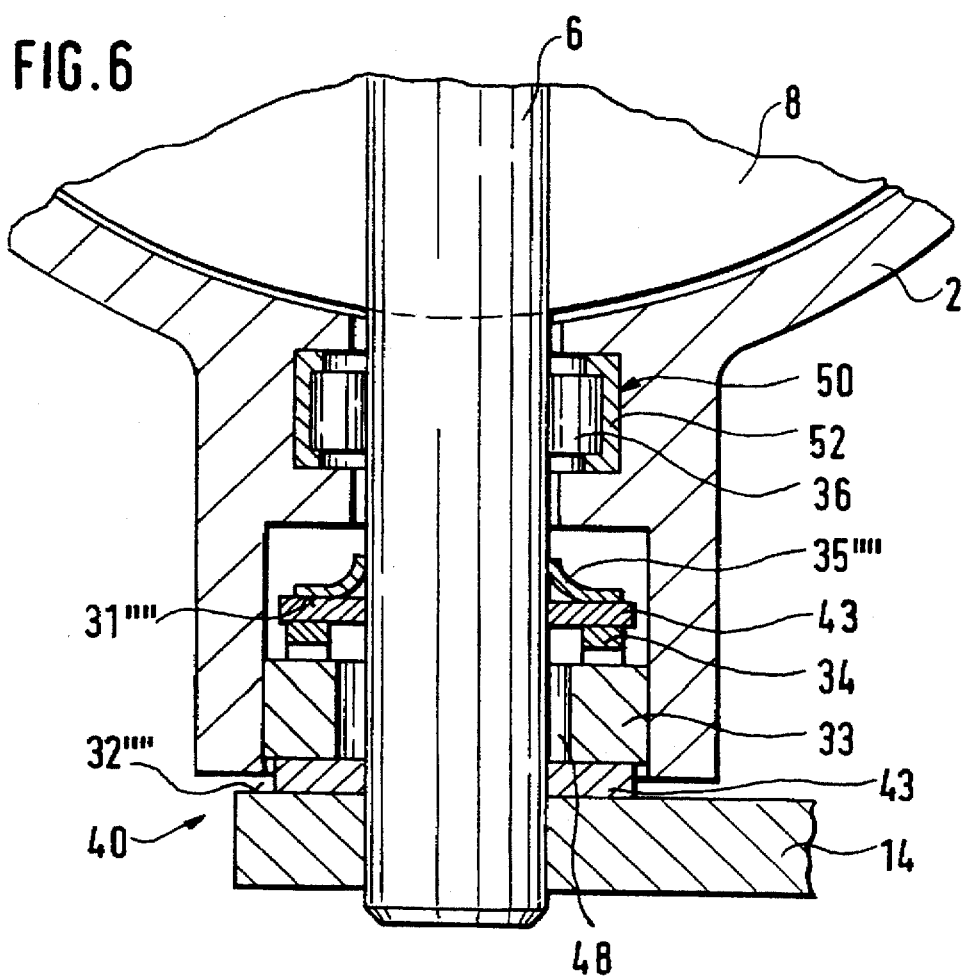

FIG. 6 shows a detail of a further preferably selected exemplary embodiment of the throttle device according to the invention.

In contrast to the exemplary embodiments illustrated in the other figures, in the exemplary embodiment selected for FIG. 6 the radial mounting and axial fixing of the throttle flap shaft 6 are separated from one another.

There is a radial play 48 between the bearing means 33 and the throttle flap shaft 6. The radial play 48 has a dimension such that the throttle flap shaft 6 does not come into contact with the bearing means 33 under any circumstances.

In the exemplary embodiment illustrated in FIG. 6, the clamping means 34 ensures an axial clamping of the bearing means 33 between a first stop 31"" and a second stop 32"". The clamping means 34 is, for example, a corrugated peripheral resilient washer. The holding element 35"" catches radially with the throttle flap shaft 6 and holds the corresponding components at the intended location.

Since, in the exemplary embodiment shown in FIG. 6, no radial guidance of the throttle flap shaft 6 is possible via the bearing means 33, a radial bearing 50 is additionally required. The radial bearing 50 comprises, for example, a rolling-bearing cage 52, in which the rolling bearings 36 are mounted and guided.

FIGS. 1 and 3 show the throttle flap shaft 6 mounted on two sides. However, the described axial fixing of the throttle flap shaft 6 is also possible just as effectively in the case of a throttle flap shaft mounted only on one side.

In the exemplary embodiments according to FIGS. 1, 5 and 6, the bearing means 33 is fixed at least indirectly relative to the throttle flap shaft 6 in the axial direction, that is to say in the longitudinal direction with respect to the throttle flap shaft 6. In the circumferential direction, the throttle flap shaft 6 is freely pivotable relative to the bearing means 33 or the bearing means 33 freely pivotable relative to the throttle flap shaft 6, at least over an angle determined as a consequence of construction. On the other hand, the bearing means 33 is retained in the bearing recess 10 at least indirectly, that is to say directly or else, for example, via a sleeve. The bearing means 33 is preferably gripped fast in the bearing recess 10. Adhesive bonding would, for example, also be possible. Depending on the design, the two stops 31, 31''', 31"" and 32, 32''', 32""are located directly on the throttle flap shaft 6. However, the stops can also be located only indirectly on the throttle flap shaft 6, for example via the means of articulation 14.

In the exemplary embodiments according to FIGS. 3 and 4, the bearing means 33 is fixed at least indirectly relative to the throttle flap housing 2 in the axial direction, that is to say in the longitudinal direction with respect to the throttle flap shaft 6. In the circumferential direction, the bearing means 33 is freely pivotable relative to the throttle flap housing 6, at least over an angle determined as a consequence of construction. On the other hand, the bearing means 33 is retained on the throttle flap shaft 6 at least indirectly, that is to say directly or else, for example, via a sleeve. The bearing means 33 is preferably gripped fast on the throttle flap shaft 6. Adhesive bonding would, for example, also be possible. Depending on the design, the two stops 31' and 32' or 31" and 32" are located directly on the throttle flap housing 2. However, the stops can also be located indirectly on the throttle flap housing 2, for example via the holding element 35' or 35".

A preferred design arises as a result of the clamping means 34 which clamps the bearing means 33 against one of the two stops 31, 31''', 31'''', 32, 32''', 32'''' (FIGS. 1, 5 and 6) or against one of the two stops 31', 31'', 32', 32'' (FIGS. 3 and 4). On account of the clamping means 34, the bearing means 33 is clamped between the two stops 31 and 32 (FIG. 1) or 31' and 32' (FIG. 3) or 31'' and 32'' (FIG. 4) or 31''' and 32''' (FIG. 5) or 31'''' and 32'''' (FIG. 6) and is thus fixed in the axial direction. Since the clamping means 34 is elastic, dimensional tolerances can be compensated to a very high degree.

During the assembly of the throttle devices illustrated in FIGS. 1, 5 and 6, the bearing means 33, which is pivotable and axially fixed relative to the throttle flap shaft 6, is installed, together with the throttle flap shaft 6, in the bearing recess 10. The bearing means 33 is preferably gripped in the bearing recess 10. For example, adhesive bonding or screwing, instead of gripping, or a combination thereof is also possible. The bearing recesses 10 and 12 are located directly or indirectly in or on the throttle flap housing 2.

During the assembly of the throttle devices illustrated in FIGS. 3 and 4, the throttle flap shaft 6 is installed in the bearing means 33, which is pivotable and axially fixed relative to the throttle flap housing 2. The bearing means 33 is preferably gripped on the throttle flap shaft 6. The bearing means 33 can be connected to the throttle flap shaft 6 in the same way as in FIGS. 1, 5 and 6 in FIGS. 3 and 4 the bearing means 33 can be fixed in the throttle flap housing 2.

The bearing means 33 and the throttle flap shaft 6 are initially assembled to form the preliminary subassembly 40 which is then introduced in a further production step into the bearing recess 10 (FIGS. 1, 5 and 6), or the bearing means 33 and the throttle flap housing 2 are assembled to form the preliminary subassembly 40', before the throttle flap shaft 6 is then installed in the bearing means 33 in a further production step.

The foregoing relates to preferred exemplary embodiments of the invention, it being understood that other variants and embodiments thereof are possible within the spirit and scope of the invention, the latter being defined by the appended claims.

We claim:

1. A throttle device for an internal combustion engine, comprising a throttle flap housing, a throttle flap connected to a throttle flap shaft, a first stop 31, 31''', 31'''') and a second stop (32, 32''', 32'''') provided at least indirectly on said throttle flap shaft, the throttle flap shaft being pivotably mounted in a bearing recess provided on the throttle flap housing and being pivotable by means of an actuating device engaging on the throttle flap shaft, wherein there is provided a bearing means (33) which is at least indirectly fixed in the axial direction relative to the throttle flap shaft (6) and which is pivotable in the circumferential direction relative to the throttle flap shaft (6), the bearing means (33) being retained at least indirectly in the bearing recess (10) in an axial direction between said first and second stops, and a claiming means (34) which clamps said bearing means (33) against one of said first and second stops.

2. The throttle device as claimed in claim 1, wherein the bearing means (33) serves for transmitting radial forces between the throttle flap shaft (6) and the throttle flap housing (2).

3. The throttle device as claimed in claim 1, wherein the clamping means (34) is an elastic means.

4. The throttle device as claimed in claim 3, wherein the clamping means (34) serves for sealing off a space between the throttle flap shaft (6) and the throttle flap housing (2).

5. The throttle device as claimed in claim 1, wherein the clamping means (34) serves for sealing off a space between the throttle flap shaft (6) and the throttle flap housing (2).

6. A throttle device for an internal combustion engine, with a throttle flap housing and with a throttle flap connected to a throttle flap shaft, a first stop (31, 31''', 31'''') and a second stop (32, 32''', 32'''') provided at least indirectly on said throttle flap housing the throttle flap shaft being pivotably mounted in a bearing recess provided on the throttle flap housing and being pivotable by means of an actuating device engaging on the throttle flap shaft, wherein there is provided a bearing means (33) which is at least indirectly fixed in the axial direction relative to the throttle flap housing (2) and which is pivotable in the circumferential direction relative to the throttle flap housing (2), the bearing means (33) being retained at least indirectly on the throttle flap shaft (6) in an axial direction between said first and second stops, and a clamping means (34) which clamps said bearing means (33) against one of said first and second stops.

7. The throttle device as claimed in claim 6, wherein the bearing means (33) serves for transmitting radial forces between the throttle flap shaft (6) and the throttle flap housing (2).

8. The throttle device as claimed in claim 6, wherein the clamping means (34) is an elastic means.

9. The throttle device as claimed in claim 8, wherein the clamping means (34) serves for sealing off a space between the throttle flap shaft (6) and the throttle flap housing (2).

10. The throttle device as claimed in claim 6, wherein the clamping means (34) serves for sealing off a space between the throttle flap shaft (6) and the throttle flap housing (2).

11. A method for producing a throttle device for an internal combustion engine, comprising forming a throttle flap housing, forming a throttle flap and connecting said throttle flap to a throttle flap shaft, pivotably mounting the throttle flap shaft in a bearing recess provided on the throttle flap housing, initially, assembling the throttle flap shaft (6) together with a bearing means (33) which is pivotable in a circumferential direction relative to the throttle flap shaft (6) and at least indirectly fixing said bearing means relative to the throttle flap shaft (6) in an axial direction, and subsequently installing the throttle flap shaft (6), together with the bearing means (33), in the bearing recess (10) providing a first stop (31, 31''', 31'''') and a second stop (32, 32''', 32'''') at least indirectly on said shaft with said bearing means clamped by a clamping means between said first stop and said second stop.

12. A method for producing a throttle device for an internal combustion engine, comprising forming a throttle flap housing, forming a throttle flap and connecting said throttle flap to a throttle flap shaft, pivotably mounting the throttle flap shaft in a bearing recess provided on the throttle flap housing, initially, assembling the throttle flap housing (2) together with a bearing means (33) which is pivotable in a circumferential direction relative to the throttle flap housing (2) and indirectly fixing the bearing means relative to the throttle flap housing (2) in an axial direction, and subsequently installing the throttle flap shaft (6) at least indirectly in the bearing means (33) providing a first stop 31, 31''', 31'''') and a second stop (32, 32''', 32'''') at least indirectly on said throttle flap housing with said bearing means clamped by a clamping means between said first stop and said second stop.

* * * * *